(12) United States Patent
Hartman

(10) Patent No.: US 10,962,161 B2
(45) Date of Patent: Mar. 30, 2021

(54) ROTATING FEMALE PORTION AND SAFETY LOCK FOR CAM LOCK FITTING

(71) Applicant: Jeffrey Hartman, Mobile, AL (US)

(72) Inventor: Jeffrey Hartman, Mobile, AL (US)

( * ) Notice: Subject to any disclaimer, the term of this patent is extended or adjusted under 35 U.S.C. 154(b) by 66 days.

(21) Appl. No.: 16/517,379

(22) Filed: Jul. 19, 2019

(65) Prior Publication Data

US 2019/0338876 A1 Nov. 7, 2019

Related U.S. Application Data

(62) Division of application No. 15/041,670, filed on Feb. 11, 2016, now Pat. No. 10,443,774.

(51) Int. Cl.
*F16L 37/18* (2006.01)

(52) U.S. Cl.
CPC ......... *F16L 37/18* (2013.01); *Y10T 29/49826* (2015.01); *Y10T 29/49945* (2015.01)

(58) Field of Classification Search
CPC ................ F16L 37/18; Y10T 29/49826; Y10T 29/49945
See application file for complete search history.

(56) References Cited

U.S. PATENT DOCUMENTS

| | | | |
|---|---|---|---|
| 949,608 A * | 2/1910 | Watt | |
| 3,017,203 A * | 1/1962 | Macleod | F16L 31/00 285/256 |
| 5,368,343 A * | 11/1994 | Allen | F16L 37/18 16/446 |
| 5,722,697 A | 3/1998 | Chen | |
| 5,863,079 A * | 1/1999 | Donais | F16L 35/00 285/312 |
| 5,904,380 A * | 5/1999 | Lee | F16L 37/18 285/312 |
| 5,927,760 A * | 7/1999 | Rocha | F16L 37/18 138/96 R |
| 6,206,431 B1 | 3/2001 | Street | |
| 6,508,274 B2 | 1/2003 | Street | |
| 7,147,004 B1 | 12/2006 | Hartman | |
| 7,354,077 B1 | 4/2008 | Jumonville | |
| 10,443,774 B1 * | 10/2019 | Hartman | F16L 37/18 |
| 2013/0106095 A1 * | 5/2013 | Chen | F16L 37/18 285/85 |
| 2013/0320663 A1 | 12/2013 | Wawchuk | |

FOREIGN PATENT DOCUMENTS

EP 0134152 A2 * 3/1985 ............. F16L 37/18

* cited by examiner

*Primary Examiner* — James M Hewitt, II
(74) *Attorney, Agent, or Firm* — George L Williamson

(57) ABSTRACT

A cam lock fitting having a rotating female portion which may include a safety lock which prevents separation of the male and the female portions of the fitting to prevent inadvertent pressurized discharges. Rotation of the female portion is accomplished by placing a connecting collar on the rear of the female end portion so that the female portion rotates about the connecting collar. The safety lock mechanism operates by placing opposing notches in the end of the male portion so that when the cam levers are opened the male and female portions of the cam lock fitting initially only slightly separate allowing the operator to quickly reclose the cam lock fitting if it contains pressurized material. The rotating female portion easily aligns the cam lobes of the cam lever with the notches on the male coupling so that the male and female portions can be separated.

12 Claims, 3 Drawing Sheets

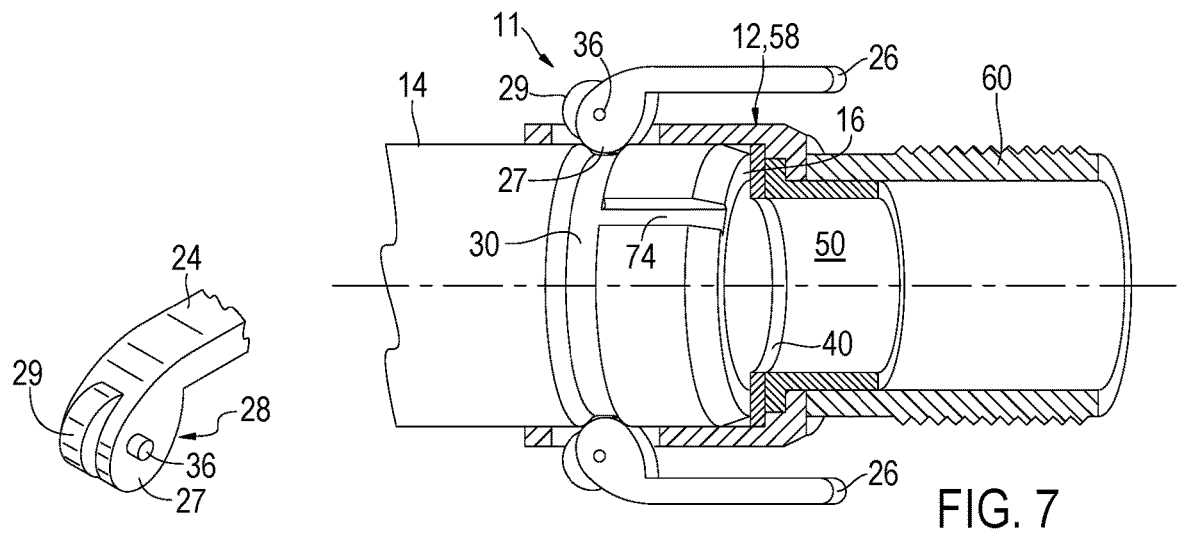
FIG. 7
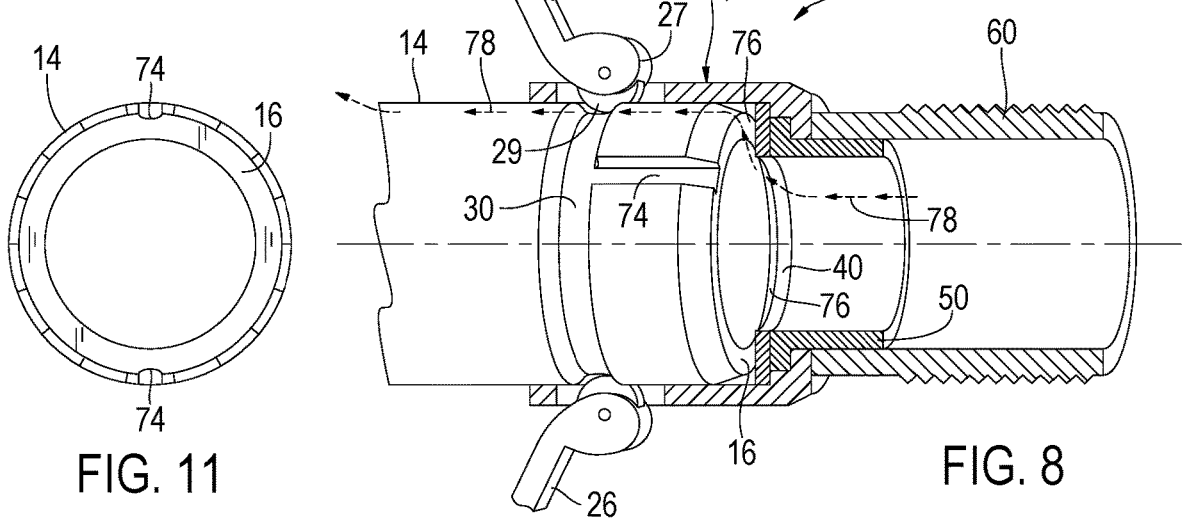
FIG. 10
FIG. 11
FIG. 8
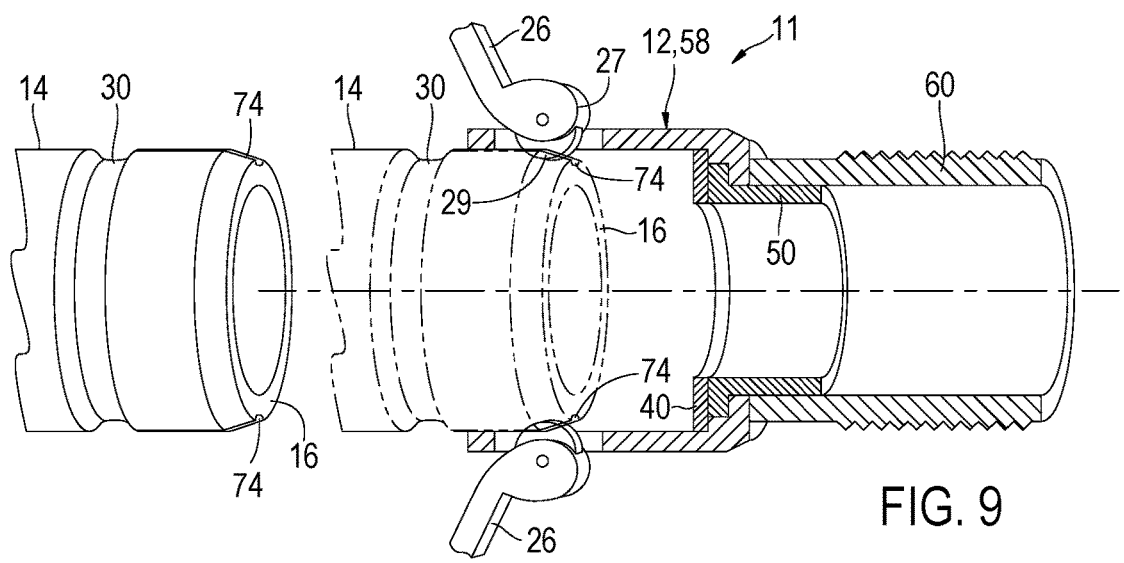
FIG. 9

ROTATING FEMALE PORTION AND SAFETY LOCK FOR CAM LOCK FITTING

BACKGROUND OF THE INVENTION

Field of the Invention

The present invention relates generally to cam lock fittings and, more particularly, is concerned with a cam lock fitting having a rotating female portion and may include a safety lock thereon.

Description of the Related Art

It is believed that cam lock fittings having rotating female portions are unknown in the related art, however, cam lock fittings having safety features have been described in the related art. However, none of the related art devices disclose the unique features of the present invention. U.S. Pat. No. 3,017,203 to Macleod, dated Jan. 16, 1962, disclosed connectors for plastic hose. U.S. Pat. No. 6,095,190 to Wilcox, et al., dated Aug. 1, 2000, disclosed a coupling with a female half having internal pressure relief. U.S. Pat. No. 5,863,079 to Donais, et al., dated Jan. 26, 1999, disclosed a quick-connect, disconnect coupling. U.S. Pat. No. 5,595,217 to Gillen, et al., dated Jan. 21, 1997, disclosed a dry break coupling assembly with a cam locking connection system. U.S. Pat. No. 5,234,017 to Aflin, et al., dated Aug. 10, 1993, disclosed a restrictor valve for metered liquid dispensing system. U.S. Pat. No. 4,538,632 to Vogl dated Sep. 3, 1985, disclosed a shut-off valve for a fuel truck or tanker drain off having down spouts. U.S. Pat. No. 4,269,215 to Odar dated May 26, 1981, disclosed a vapor flow control valve. U.S. Pat. No. 3,860,274 to Ledstrom, et al., dated Jan. 14, 1975 disclosed a pipe coupling. U.S. Pat. No. 4,222,593 to Laufenburger disclosed a fluid conveying coupling with safety locking device. U.S. Pat. No. 8,123,256 to Hartman dated Feb. 28, 2012 disclosed a safety lock for a cam lock fitting. U.S. Pat. No. 7,147,004 to Hartman dated Dec. 12, 2006 disclosed a check valve for a cam lock fitting. U.S. Pat. No. 3,383,123 to Murray dated May 14, 1968 disclosed a line pressure responsive safety coupling. U.S. Pat. No. 5,338,069 dated Aug. 16, 1994 to McCarthy disclosed a positively locking quick release coupling. U.S. Pat. No. 8,632,103 dated Jan. 21, 2014 to Fahie, et al. disclosed a lock for cam and groove coupler.

While these devices related to cam lock fittings may be suitable for the purposes for which they were designed, they would not be as suitable for the purposes of the present invention, as hereinafter described. As will be shown by way of explanation and drawings, the present invention works in a novel manner and differently from the related art.

SUMMARY OF THE PRESENT INVENTION

The present invention discloses a rotating female portion for a cam lock fitting and may include a safety lock assembly for the cam lock fitting so that when the cam lock fitting is pressurized unbeknownst to the operator and the operator attempts to open the cam lock fitting the safety lock assembly will prevent operation or complete separation of the male and the female portions of the fitting to prevent inadvertent pressurized discharge of the dangerous materials. Rotation of the female portion is accomplished by placing a connecting collar member on the female end portion so that the female portion rotates about the connecting collar portion even when a hose is connected. The safety lock mechanism operates by placing opposing notches in the end of the male portion of the cam lock fitting so that when the cam levers are opened the male and female portions of the cam lock fitting initially only slightly separate from each other allowing the operator to quickly reclose the cam lock fitting if the operator observes that the cam lock fitting still contains pressurized material. The rotating female portion rotates so as to easily align the cam lobes of the cam lever with the notches on the male coupling so that the male and female portions can be separated.

A major problem sought to be solved by the present invention occurs when an operator of a conventional cam lock fitting undertakes the operation of opening a conventional cam lock fitting the operator may not know if the contents of the conventional fitting are still under pressure, and if the contents are still under pressure the contents will spew out when the conventional fitting is opened possibly resulting in injury to the operator or an unwanted release of materials to the environment. The present invention resolves this problem by allowing the improved cam lock fitting to be only partially opened by means of a safety lock feature which allows the improved fitting to be reclosed if the operator observes that the contents inside the improved fitting remain pressurized.

An object of the present invention is to provide a cam lock fitting having a female portion which can be easily rotated by an operator. A further object of the present invention is to provide a safety lock on a cam lock fitting so as to prevent overflows of fluid when the cam lock fitting is opened. A further object of the present invention is to provide a safety lock which can be easily operated by a user as a part of the normal operation of a cam lock fitting. A further object of the present invention is to provide a safety lock which will remain locked when the cam lock fitting is pressurized. A further object of the present invention is to provide a safety lock on a cam lock fitting which will prevent inadvertent pressurized discharges of environmentally damaging material from the cam lock fitting. A further object of the present invention is to provide a safety lock on a cam lock fitting which can be relatively inexpensively manufactured.

The foregoing and other objects and advantages will appear from the description to follow. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIGS. 7-9 are sectional views of a second embodiment of the present invention with certain parts shown in perspective for ease of illustration.

FIG. 10 is a perspective view of the cam lobe of a second embodiment of the present invention.

FIG. 11 is an end elevation view of portions of the second embodiment of the present invention.

LIST OF REFERENCE NUMERALS

Figure 1:
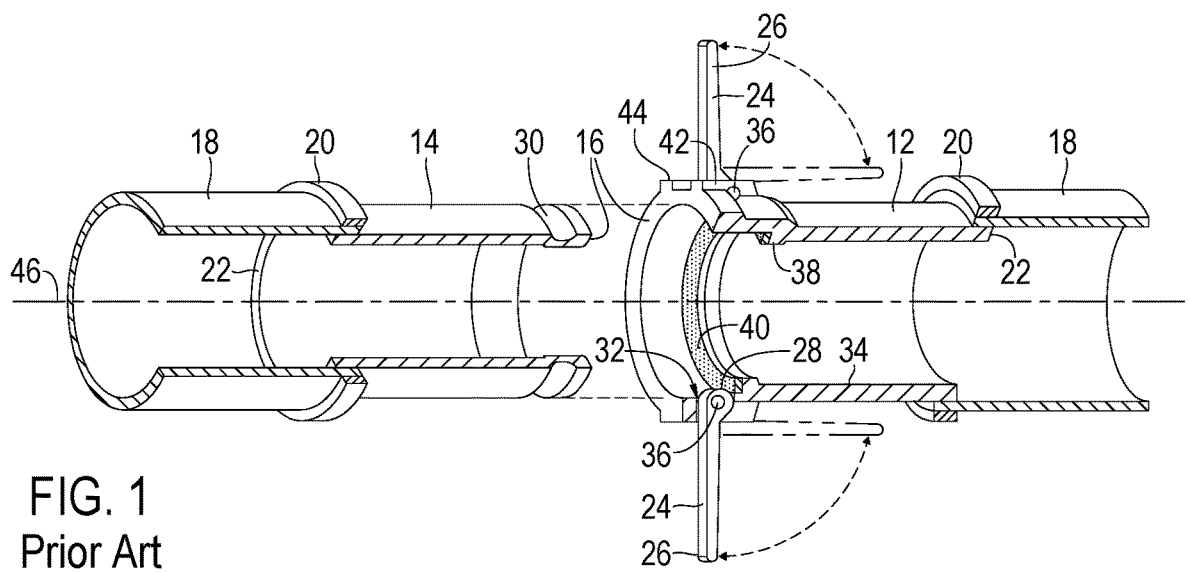
FIG. 1 is a perspective view of a prior art cam lock fitting.
Figure 2:
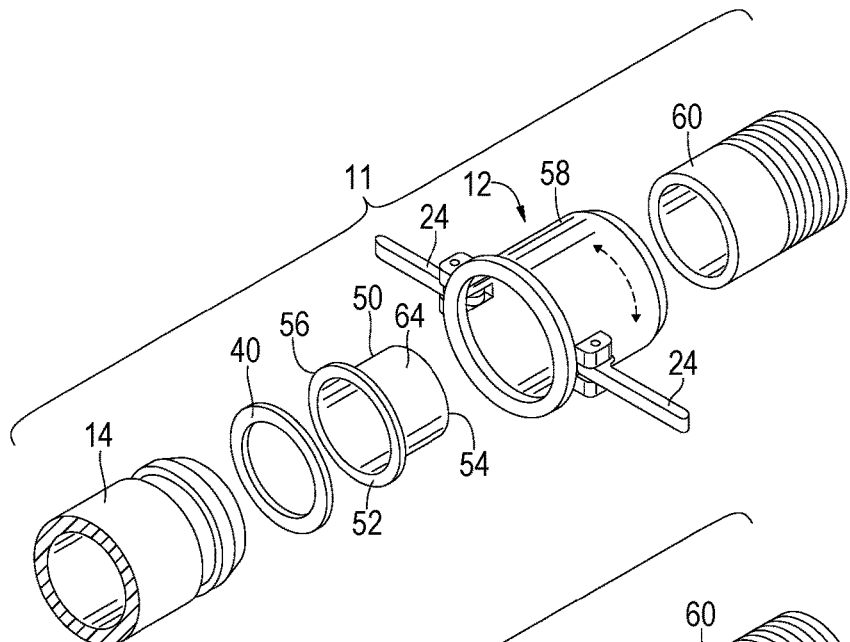
FIG. 2 is an exploded perspective view of one embodiment of the present invention.
Figure 3:
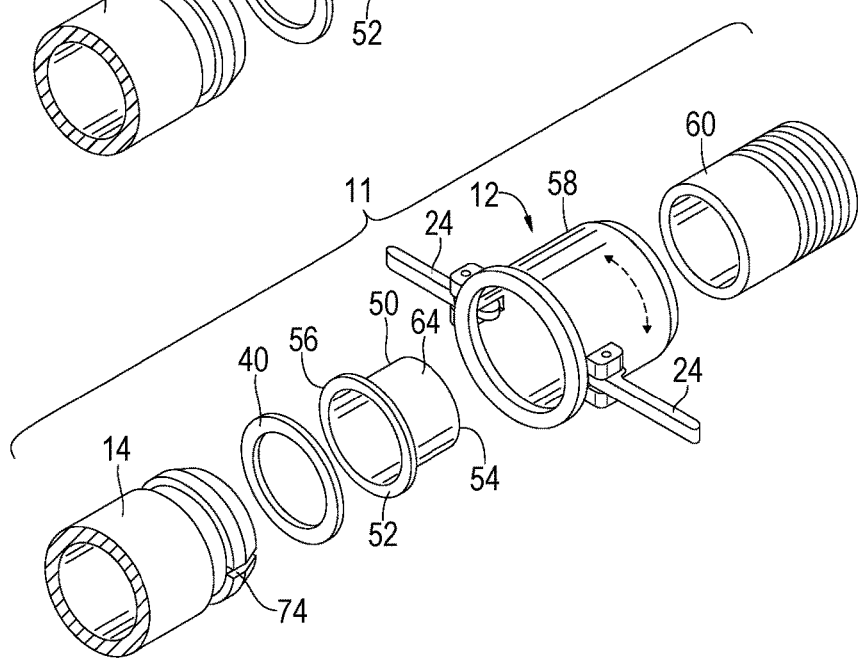
FIG. 3 is an exploded perspective view of a second embodiment of the present invention.

With regard to reference numerals used, the following numbering is used throughout the drawings.
- 10 prior art cam lock fitting
- 11 cam lock fitting of the present invention
- 12 female end portion
- 14 male end portion
- 16 front end
- 18 hose
- 20 band clamp
- 22 rear end
- 24 cam lever/ear
- 26 lever portion
- 27 larger cam lobe portion
- 28 cam portion
- 29 smaller cam lobe portion
- 30 groove
- 32 opening
- 34 wall of cam lock fitting
- 36 axle
- 38 flange
- 40 gasket
- 42 boss
- 44 boss
- 46 centerline
- 48 enlarged area
- 50 connecting collar
- 52 front end of connecting collar
- 54 rear end of connecting collar
- 56 outer flange
- 58 front section of female end portion
- 60 tail section of female end portion
- 62 inner flange
- 64 outer surface of connecting collar
- 66 interior surface of tail section
- 68 front end portion of tail section
- 70 rear end portion of tail section
- 72 press fit portion
- 74 notch
- 76 space
- 78 arrows

DETAILED DESCRIPTION OF THE PREFERRED EMBODIMENT

The following discussion describes in detail at least one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims. FIGS. 1-11 illustrate the present invention wherein a cam lock fitting having a rotating female portion along with a safety locking mechanism is disclosed.

Turning to FIG. 1, therein is shown a prior art version of a conventional cam lock fitting generally indicated by reference number 10 having a female end coupling portion 12 and a male end coupling portion 14 each having a front end 16 which when joined together form a conduit through which fluid or the like will flow. A hose 18 having a band clamp 20 thereon is attached to a rear end 22 of each female 12 and male 14 portions; hose 18 ranges in size from about one inch to about 8 inches and are generally heavy for relatively high pressure. The female portion 12 has a pair of cam levers or ears 24 each having a lever portion 26 and a cam portion 28 thereon, which cam portion locks the female end 12 to the male end 14 by seating the cam portion 28 of the female portion within a groove 30 of the male portion so that the two portions with hoses 18 are joined together to form a conduit so that materials can pass therethrough. The cam portion 28 projects through an opening 32 in the wall 34 near the front end 16 of the female portion 12 as the ears 24 pivot on axles 36. Direction arrows are used to show movement of ears 24 between a closed position adjacent the female portion 12 and an open position away from the female portion 12. Also shown on the inside of the female portion 12 is annular flange 38 having a flexible gasket or O-ring seal 40 therein wherein the flange and gasket extend entirely around the internal periphery of the female portion for making sealing contact with the end 16 of the male end portion 14 in a conventional manner. The ears 24 are each mounted onto an axle 36 extending through a first, left and second, right bosses 42, 44 on opposite sides of the female coupling 12. The female end portion 12 has no portions which are rotatable along its length from the front end 16 to its rear end 22, nor, is the female end portion 12 easily rotated about its centerline 46 and around the male end portion 14 when a hose 18 is connected to the female end portion 12 due to the resistance of the hose 18. Likewise, the male end portion 14 cannot be easily rotated about its centerline when hose 18 is connected thereto due to the resistance offered by the hose. The hose 18 of the type normally used with cam lock fittings 10 of the type described herein are usually rugged and made of heavy material so that they offer great resistance to being twisted or rotated about its centerline 46. The male end portion 14 has groove 30 therein the formation of which groove causes an enlarged area or enlargement 48 to be formed between the groove and end 16 when viewed in cross-section.

Figure 4:
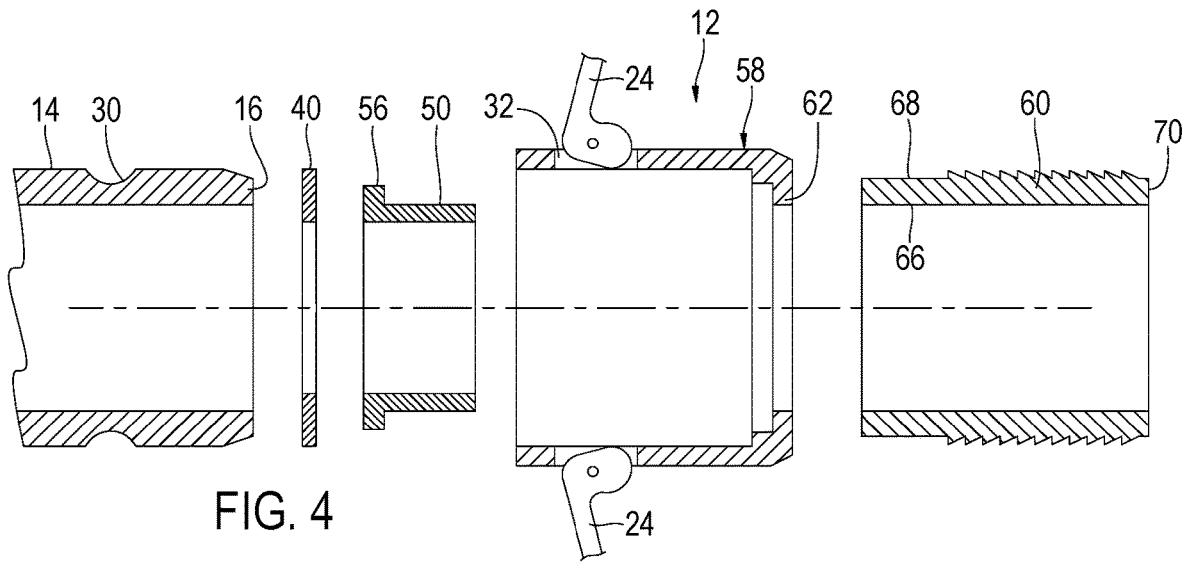
FIGS. 4-6 are sectional views of one embodiment of the present invention with certain parts shown in elevation for ease of illustration.
Figure 5:
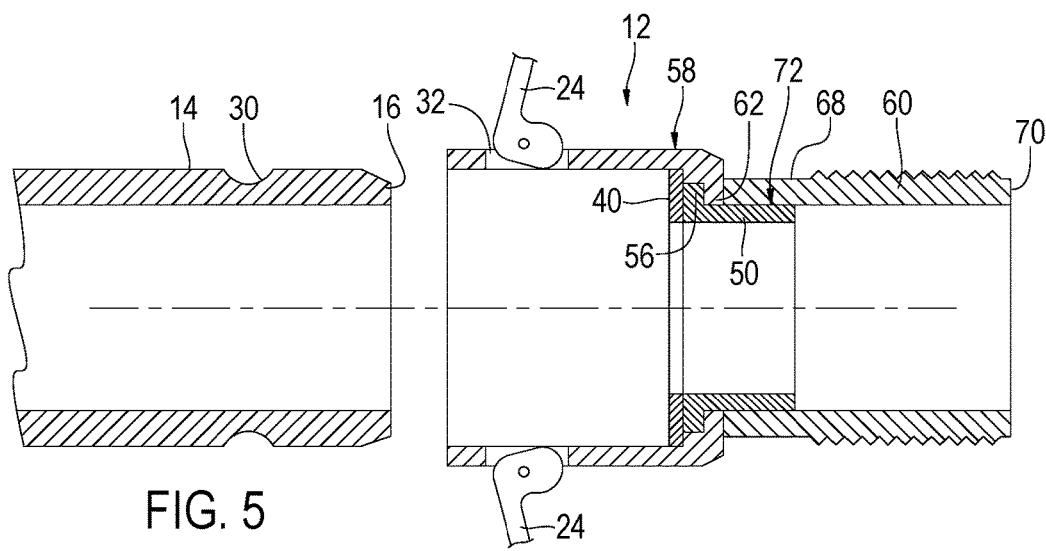
Figure 6:
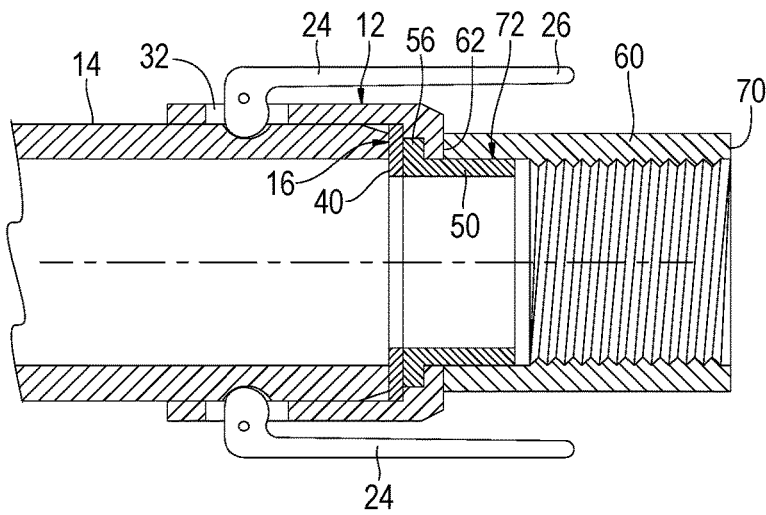

Turning to FIGS. 2, 4, 5 and 6, therein is shown one embodiment of an improved cam lock fitting according to the present invention. The embodiment disclosed is similar to a conventional prior art cam lock fitting 10 as shown in FIG. 1; however, the present invention includes a connecting collar 50 having a front end 52 and a rear end 54 with an outer annular peripheral flange 56 thereon which collar or circular sleeve is complimentarily sized and shaped for insertion into the inside of the female portion 12. Also shown is the female end portion 12 being of a two-piece design having a first front section 58 and a second tail section 60. FIGS. 4, 5 and 6 illustrate the steps of assembling and operating the present invention showing how the connecting collar 50 can be inserted into the inside of the first section 58 of the female portion 12 and inside of the second, tail section 60 of the female portion wherein the first flange 56 contacts an internally extending flange 62 on the rear of the female coupling so as to be held firmly within the female coupling with the exterior surface 64 of the connecting collar 50 contacting the interior surface 66 of the front end 68 of the tail section 60 of the female coupling 12 wherein it is expected that the rear end of the connecting collar 50 will be press fit at 72 to the tail section 60 of the female coupling end 12. The gasket or seal 40 is inside the female coupling 12 so as to be in contact with the flange 56 on the connecting collar 50 as shown in FIG. 5 so that when the male portion 14 is inserted into the female end portion 12, the front end 16 of the male portion contacts the seal 40 so as to make a seal between the male end portion 14 and the female coupling 12 as shown in FIG. 6 when the ears 24 are closed. The rear end 70 of tail section 60 is shown with a barbed end in FIG. 4, male pipe threads in FIG. 5, and female pipe threads in FIG. 6. The front section 58 is free to rotate about the connecting collar 50 while the tail section 60 is fixedly joined to the connecting collar as previously described and a sealing connection (See FIG. 6) is made between the end 16 of the male end potion 14 and the sealing gasket 40 and flange 56 of the connecting collar 50 as best shown in FIG. 6. The press fit portion 72 between connecting collar 50 and tail section 60 is shown on FIGS. 5 and 6.

Turning to FIGS. 3, 7, 8, 9, 10, and 11, therein is shown the second embodiment of the present invention wherein a safety lock feature is included as part of the present invention 11. This embodiment includes all the features of the first embodiment as previously disclosed in FIGS. 2, 4, 5 and 6; however, it also includes a safety lock mechanism created by placing opposing notches 74 in the end of the male portion 14 of the cam lock fitting which operate in conjunction with a cam lever 24 having a cam portion 28 having specially designed cam lobes that are sized and shaped so that the cam lobes can pass through the notches 74 on the male portion so that the male 14 and female 12 ends can be separated. In order to align the cam lobes 28 with the notches 74 the front section 58 of the female end portion 12 must be rotated about the connecting collar 50 as taught by the present invention. The cam lobe 28 comprises two portions as best shown in FIG. 10; a first larger lobe portion 27 and a second smaller lobe portion 29 expected to have a central angle offset from each other about seventy-five (75) to one hundred-forty (140) degrees as measured relative to its axle 36. When the cam lever 24 is opened the first portion to release from groove 30 is the larger portion 27 which slightly loosens the male end 14 to allow a slight space to form between the end 16 of the male end portion 14 and the female end portion 12; however, the smaller lobe 29 remains in the groove 30 of the male end so that the male end can only be completely released when the female end 12 is rotated so that the smaller lobe 29 is aligned with the notch 74; when this occurs, the smaller lobe 29 can be passed through the notch 74 to allow the male 14 and female 12 ends to be completely separated from each other.

Turning more specifically to FIGS. 7-9, therein is shown the movement of the male end portion 14 relative to the female portion 12 along with rotation of the female portion 12 as the cam lock fitting 11 is being opened; the steps would be reversed for closure of the cam lock fitting. FIG. 7 shows the male end portion 14 mated tightly to the female portion 12 as would be the condition when the cam lock fitting 11 is in a sealed position with lever 26 in a downward closed position so that the end 16 of the male end portion 14 is tightly sealed against the front side of gasket 40 of the female end portion 12 with the larger lobe 27 in groove 30; also, the rear side of gasket 40 is tightly sealed against the front surface of the connecting collar 50. In contrast, FIG. 8 shows the smaller lobe 29 remaining in the groove 30 and shows the male end portion 14 with a small space 76 being defined in between its end 16 and the gasket 40 which would occur when the cam lever 26 is in an upward open position which would cause the ends 16 of female end portion 12 and male end portion 14 to slightly separate thereby allowing the release of pressure or a small amount of material as indicated by arrows 78 from the inside of the female portion 12 of the cam lock fitting 11. Arrows 78 illustrate material/fluid moving into space 76 and then out the fitting 11 by escaping between the male and female couplings 14, 12. Smaller cam lobe 29 remains disposed in groove 30 in both FIGS. 7 and 8 because the female end portion has not yet been rotated about connecting collar 50 to align smaller cam lobe 29 with notch 74. In contrast, FIG. 9 illustrates that the male end 14 can only be completely released when the female end 12 is rotated so that the smaller lobe 29 is aligned with the notch 74; when this occurs, the smaller lobe 29 can be passed through the notch 74 to allow the male 14 and female 12 end to be completely separated from each other. Previously disclosed elements may also be shown.

Turning more specifically to FIGS. 10 and 11, an enlarged view of the cam portions 28 are shown illustrating that the larger portion 27 is wider than the smaller portion 29 and has a larger radius so that when the larger portion 27 protrudes into groove 30 it substantially fills the complimentarily sized groove causing a complete seal between the gasket 40 and the male end portion 14 as shown in FIG. 7; however, when the smaller portion 29 protrudes into groove 30 it doesn't completely fill the groove so the space 76 is formed as shown in FIG. 8 between the end 16 of the male end 14 and the gasket 40 and the female end portion 12. Also note that the smaller cam lobe portion 29, being narrower than notch 74 and the larger lobe 27, is sized to pass through notch 74; however, larger cam lobe portion 27 being wider cannot pass through notch 74 because it is wider than the notch. FIG. 11 shows the end of a male end portion 14 and the notches 74 oppositely disposed in the end of the male end portion.

By way of additional general explanation, and by making reference to FIGS. 1-11, the present invention discloses a rotating female end portion 12 which may include a safety lock mechanism. The female end portion 12 is made rotatable by providing a connecting collar 50 press fit or otherwise joined (for example, by pipe threading or welding) to a tail section 60 of the female end portion which connecting collar has an outwardly extending flange 56 thereon which flange secures the rotating female end portion 12 to the tail section. The rotatable female end portion 12 is rotatable even when a hose 18 is connected to the cam lock fitting 11 of the present invention. When the safety lock features are used in conjunction with the rotating female end portion 12 the cam levers 24 are positioned downwardly so that the lever portion 26 is disposed adjacent the female end portion 12 as would occur when the cam lock fitting 11 is closed and sealed wherein the larger cam lobe portion 27 are positioned in notch 74. In order to open the cam lock fitting 11, an operator must first move the lever portions 26 of the cam levers 24 from the closed position to the open position so as to allow the end 16 of male coupling 14 to initially move slightly away from the gasket 40 of female coupling 12 thereby creating a small space 76 (see FIG. 8) to allow the operator to determine by visual observation whether the cam lock fitting 11 is pressurized or unpressurized. In this position the smaller cam portion 29 is disposed in groove 30 but not aligned with notch 74. If the cam lock fitting 11 remains pressurized, the operator can quickly and easily reclose the cam lock fitting 11 by reclosing the cam levers 26. If the cam lock fitting 11 is unpressurized, the operator can then proceed to open the cam lock fitting by rotating the female end portion 12 so as to align the smaller cam lobe portion 29 with notch 74 so that the male 14 and female 12 portions can be completely separated. It should be clear that the present invention 11 teaches that, relative to the prior art 10, additional steps are required to open or close a cam lock fitting constructed according to the teachings of the present invention 11, and, the additional steps involve rotating the female end portion 12 as taught herein.

Direction arrows may be used in the drawings related to this specification to show direction of fluid flow, movement, or other activity/action described herein.

I claim:

1. A cam lock fitting, comprising:
   a) male and female conduits for being connected to each other, said male conduit having an end thereon and an external peripheral groove adjacent said end, said female conduit being of two piece construction comprising a front portion and a tail portion;
   b) a connecting collar having an outer flange at a first end thereof;
   c) first and second cam members being disposed on opposite sides of said female conduit, said cam members having a lever portion and a cam portion wherein each said cam portion is adapted to rotate through an opening in a wall of said female conduit and into said groove so as to removably join said male conduit to said female conduit, wherein each said cam member has a first closed position when said male and female conduits are connected to each other and a second open position when said male and female conduits are disconnected from each other;
   d) a second end of said connecting collar adapted for insertion into said front portion of said female conduit with said outer flange abutting an inner flange at a rear end of said front portion;
   e) an end of said male conduit adapted for insertion into said front portion of said female conduit until said end abuts said outer flange of said connecting collar, a gasket disposed between said outer flange and said end of said male conduit, whereby said front portion of said female conduit is rotatable independently of said tail portion thereof about said connecting collar; and
   f) wherein said cam members are rotatable to lock said male and female conduits together.

2. The cam lock fitting of claim 1, wherein a rear portion of said connecting collar is fixedly joined to a front end portion of said tail portion.

3. The cam lock fitting of claim 2, wherein said cam portion has a larger cam lobe portion and a smaller cam lobe portion, wherein said male and female conduits are connected to each other or disconnected from each other only when said smaller cam lobe portion is aligned with a first and second opposing notch disposed on an outer peripheral surface of said male conduit between said groove and said end of said male conduit and parallel to a centerline of said male conduit.

4. The cam lock fitting of claim 3, wherein said smaller cam lobe portion is aligned with said opposing notches by rotation of said female conduit about said centerline.

5. The cam lock fitting of claim 4, wherein said end of said male conduit contacts said gasket of said female conduit when said larger cam lobe portion is disposed in said groove and said first and second cam members are in said first closed position.

6. The cam lock fitting of claim 5, wherein a space is defined between said end of said male conduit and said gasket of said female conduit when said smaller cam lobe portion is disposed in said groove when being out of alignment with said first and second opposing notches and said cam members are in said second open position thereby allowing leakage between said male and female conduits through said space, whereupon said cam members are moved back to said first closed position to permit the male and female conduits to be reconnected.

7. The cam lock fitting of claim 6, wherein said rear portion of said connecting collar is press fit to said front end portion of said tail section.

8. The cam lock fitting of claim 3, wherein said smaller cam lobe portion of each of said first and second cam members extends out from a side of each said larger cam portion adjacent said lever portion, whereby said smaller lobe portion enters said groove after said larger cam portion leaves said groove as said lever portion is rotated.

9. A cam lock fitting, comprising:
   a) a male conduit having an end thereon and an external peripheral groove adjacent said end;
   b) a female conduit for receiving said male conduit and having a pair of opposed side openings opposite said external peripheral groove, wherein said female conduit has a front portion and a tail portion;
   c) a seal for sealing between said end of said male conduit and said female conduit;
   d) a pair of cam members pivotally disposed on opposite sides of said female conduit, each cam member having a lever portion lying adjacent the female conduit and a cam portion, wherein one of said cam portions passes through one of said side openings and engages said peripheral groove when said lever portion lies adjacent said female conduit in a first position, each lever portion being outwardly moveable away from said female conduit to a second position to disengage said cam portions from said peripheral groove;
   e) a connecting collar joining said front portion to said tail portion together so that said front portion rotates about a centerline thereof; and
   f) wherein said cam portion has a larger cam lobe portion and a smaller cam lobe portion, wherein said male and female conduits can be connected to each other or disconnected from each other only when said smaller cam lobe portion is aligned with a first and second opposing notch disposed on an outer peripheral surface of said male conduit between said groove and said end of said male conduit and parallel to a centerline of said male conduit.

10. The cam lock fitting of claim 9, wherein said end of said male conduit sealingly engages said seal when said larger cam lobe portion is disposed in said groove and said lever portions are in said first position.

11. The cam lock fitting of claim 10, wherein a space is defined between said end of said male conduit and said seal when said smaller cam lobe portion is disposed in said groove when being out of alignment with said first and second opposing notches and said lever portions are in said second position thereby allowing leakage between said male and female conduits through said space, whereupon said lever portions are moved back to said first position to permit the male and female conduits to be reconnected.

12. The cam lock fitting of claim 9, wherein said smaller cam lobe portion of each of said first and second cam members extends out from a side of each said larger cam portion adjacent said lever portion, whereby said smaller lobe portion enters said groove after said larger cam portion leaves said groove as said lever portion is rotated.

* * * * *